May 29, 1928.
L. L. SHERWOOD
CERTIFICATE HOLDER
Filed June 8, 1927
1,671,554
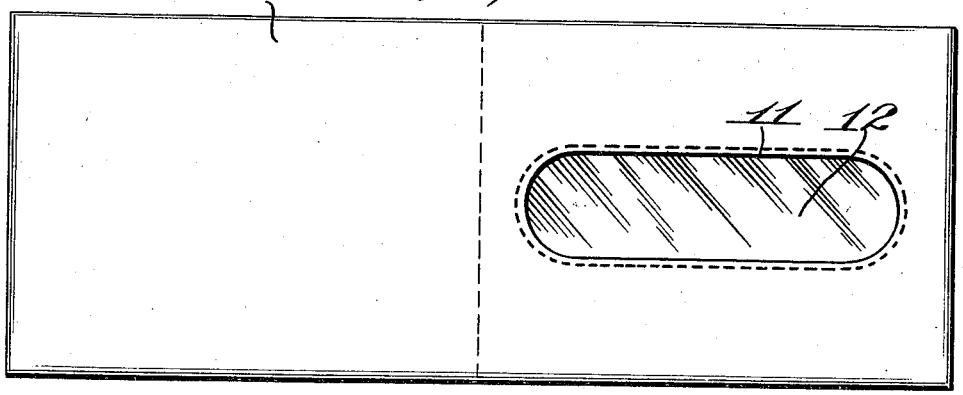
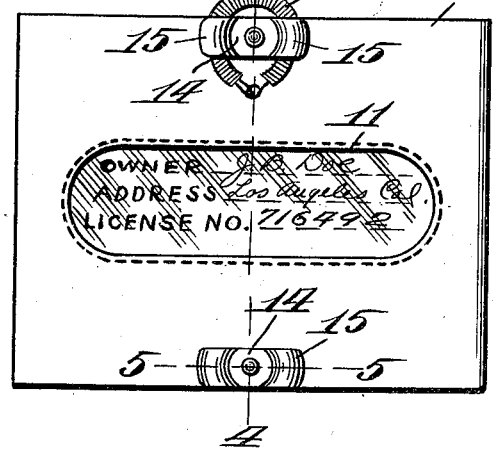 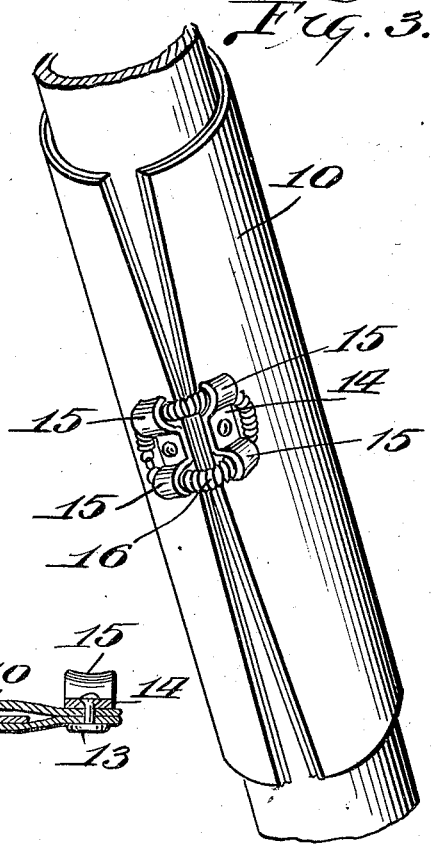
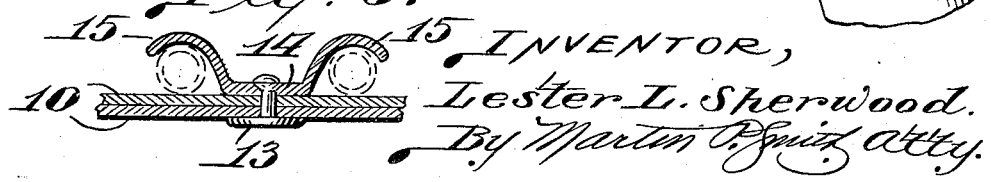
INVENTOR,
Lester L. Sherwood.
By Martin C. Smith, Atty.

Patented May 29, 1928.

1,671,554

UNITED STATES PATENT OFFICE.

LESTER L. SHERWOOD, OF LOS ANGELES, CALIFORNIA.

CERTIFICATE HOLDER.

Application filed June 8, 1927. Serial No. 197,360.

My invention relates to a holder for identification certificates or the like, that are now generally required by State laws and city ordinances, to be carried by and displayed upon motor vehicles, and my present invention is an improvement upon the certificate holder that forms the subject matter of my co-pending application for U. S. Letters Patent, filed Aug. 4, 1925, Ser. No. 48,098.

The principal objects of my invention are, to provide an identification holder that is relatively simple in construction, capable of being easily and cheaply produced and which is formed of flexible material in order that it may be readily applied to the steering post or column of an automobile where it will hold the certificate in convenient position to be observed by traffic officers or other authorized persons who may have occasion to ascertain the identity and license number of the operator or owner of the vehicle.

Further objects of my invention are, to provide an identification certificate holder that will wholly enclose and protect the inserted certificate and preserve the same in neat, clean condition; to construct the holder of flexible material such as leather, and provide the holder with an attaching number that is elastic, in order that the holder may be readily fitted on to steering posts or columns of different cross sectional shapes, and further, to provide the holder with a window or sight opening that is closed with transparent celluloid or the like, in order to expose to ready view that portion of the face of the inserted certificate that bears the owner's name, address, license number and other essential data.

A further object of my invention is to provide improved means for fastening the two walls of the holder to each other and which fastening means also functions as supports and points of attachment for the elastic member that utilized in securing the holder upon a motor vehicle steering post.

With the foregoing and other objects in view my invention consists in certain novel features of construction and arrangement of parts that will be hereinafter more fully described and claimed and illustrated in the accompanying drawings in which;

Fig. 1 is a patent view of the body of the holder in blank form before it is folded.

Fig. 2 is a plan view of the holder in open position and before it is applied to a steering post or column.

Fig. 3 is a perspective view showing the certificate holder applied to the steering post of an automobile.

Fig. 4 is a cross section taken on the line 4—4 of Fig. 2.

Fig. 5 is an enlarged cross section taken on the line 5—5 of Fig. 2.

Referring by numerals to the accompanying drawings which illustrate a practical embodiment of my invention, 10 designates a substantially rectangular section of leather, rubberized fabric, oil cloth or other thin, flexible water-proof material, the same forming the body of the holder and said body may consist of a single layer of material, or two or more layers, for instance, an outer layer or cover and a lining therefor. This flexible body is creased at a point midway between its ends, so that it may be folded on the creased line, thereby providing two sections or walls that are identical in size.

One of these walls is provided with a centrally arranged elongated opening 11 and secured in any suitable manner to the inner face of this wall is a section of flexible, transparent material 12, such as celluloid, thereby providing a window or sight opening that exposes to view a portion of the face of the certificate or card that is inserted in the holder.

When the body of the holder has been bent double, the central portion of the side edges thereof are permanently secured to each other by means of rivets 13 that pass through the layers of material of which the holder is formed, said rivets also being seated in plates 14, which latter are provided with upwardly projecting terminal portions that are curved so as to form hooks 15. These plates and hooks are positioned in the front face of front layer or member of the body of the holder immediately adjacent to the side edges thereof and the outer ends of the hooks 15 are spaced apart from the front surface of the holder.

Positioned beneath the hooks 15 on one side of the holder is a ring or loop 16 that is formed of a coil of fine wire, preferably steel, having a relatively high degree of resiliency and this said coiled wire loop may be readily stretched in order to engage the other pair of hooks when the holder is positioned around an automobile steering post or the like.

In the use of my improved certificate holder, the certificate of an automobile owner or operator is positioned between the flexible walls of the holder, so that certain data, for instance; the name, address and license number are readily visible through the window or sight opening in the front wall of the holder and the latter is now bent around an automobile steering post or the like and securely fastened thereupon by expanding the elastic ring or loop 16, so that the same engages beneath the hooks 15 that are on the opposite edge of the holder from the hooks that normally engage said loop or ring.

Thus the holder is maintained in a convenient position upon an automobile steering column or the like and the name and address of the vehicle owner or operator together with the license number of the vehicle are at all times readily visible through the window or sight opening.

The contained certificate or card is firmly clamped between the walls of the holder, due to their curved position upon the steering column and the card or certificate is fully enclosed so that it is protected against becoming soiled or discolored.

The combined plates and hooks 14 and 15, together with the rivets that are associated therewith, provide simple means for securing the edges of the walls of the holder to each other and the hooks on the ends of the plates 14 provide relatively simple and convenient points of connection for the elastic loop or ring 16.

Inasmuch as the entire body of the holder is flexible, it may be readily fitted around the steering post or column of a motor vehicle and the elasticity of the coiled wire loop enables the holder to be readily applied for use and to fit upon posts or columns of different sizes and shapes.

The minimum cost of production of my improved certificate holder enables the same to be produced in quantities and used advantageously as an advertising novelty, by motor car manufacturers and selling agencies, and where the holders are thus used, suitable advertising matter may be printed on the front face of the holder, above or below the sight opening or window therein.

It will be readily understood that minor changes in the size, form and construction of the various parts of my improved certificate holder may be made and substituted for those herein shown and described, without departing from the spirit of my invention, the scope of which is set forth in the appended claim.

I claim as my invention.

An identification holder comprising a section of flexible material, that is bent double at the middle to form front and rear walls, the front wall having an opening that is covered with flexible, transparent material, fastening means connecting the intermediate portions of the upper and lower edges of said front and rear walls, a pair of oppositely arranged hooks forming a part of each fastening means and a loop of coiled wire adapted to engage the two pairs of hooks, when the holder is applied to a support.

In testimony whereof I affix my signature.

LESTER L. SHERWOOD.